(12) United States Patent
Finlay et al.

(10) Patent No.: US 11,023,464 B2
(45) Date of Patent: Jun. 1, 2021

(54) REDUCING TEMP SIZE OVER A BASE TABLE

(71) Applicant: INTERNATIONAL BUSINESS MACHINES CORPORATION, Armonk, NY (US)

(72) Inventors: Ian Richard Finlay, Uxbridge (CA); Calisto Zuzarte, Pickering (CA); John Frederick Hornibrook, Markham (CA)

(73) Assignee: International Business Machines Corporation, Armonk, NY (US)

( * ) Notice: Subject to any disclaimer, the term of this patent is extended or adjusted under 35 U.S.C. 154(b) by 85 days.

(21) Appl. No.: 16/558,727

(22) Filed: Sep. 3, 2019

(65) Prior Publication Data

US 2021/0064617 A1  Mar. 4, 2021

(51) Int. Cl.
*G06F 16/2453* (2019.01)
*G06F 16/22* (2019.01)

(52) U.S. Cl.
CPC ...... *G06F 16/24535* (2019.01); *G06F 16/221* (2019.01); *G06F 16/2282* (2019.01); *G06F 16/24539* (2019.01); *G06F 16/24542* (2019.01)

(58) Field of Classification Search
None
See application file for complete search history.

(56) References Cited

U.S. PATENT DOCUMENTS

| 8,140,521 B1 * | 3/2012 | Sheldon | G06F 16/2454 |
| | | | 707/716 |
| 9,582,539 B1 | 2/2017 | Cole et al. | |
| 2008/0027788 A1 * | 1/2008 | Lawrence | G06Q 30/0204 |
| | | | 705/7.33 |
| 2010/0114932 A1 * | 5/2010 | Whitcher | G06F 16/2452 |
| | | | 707/760 |
| 2013/0013586 A1 | 1/2013 | Muras et al. | |

(Continued)

FOREIGN PATENT DOCUMENTS

| CN | 103886005 A | 6/2014 |
| CN | 104346433 | 2/2015 |
| CN | 110069522 | 7/2019 |

OTHER PUBLICATIONS

PCT Search report and written opinion; 9 pages; Applicant's references CA820150250; dated Dec. 9, 2020.

(Continued)

*Primary Examiner* — Christopher J Raab
(74) *Attorney, Agent, or Firm* — Schmeiser, Olsen & Watts, LLP; Stephanie Carusillo

(57) ABSTRACT

A method, system and computer program product includes receiving and parsing an SQL query, identifying at least one common sub expression, or sub-query, or combination thereof, used multiple times within the SQL query, constructing for the at least one common sub expression, or sub-query, or combination thereof, a query execution plan that maintains as part of an initial result set a bit vector for a fact table, storing a result bit vector and an indicator that tracks a last valid tuple processed to produce the result bit vector when a TEMP operation is indicated in the query execution plan, reassessing a TEMP result in other portions of the query execution plan, priming a list of tuples using the TEMP result, and retrieving respective columns for further processing in the query execution plan.

20 Claims, 6 Drawing Sheets

(56) References Cited

U.S. PATENT DOCUMENTS

| | | | |
|---|---|---|---|
| 2014/0156696 A1* | 6/2014 | Goel | G06F 16/2428 |
| | | | 707/769 |
| 2015/0363399 A1 | 12/2015 | Konik et al. | |
| 2017/0091315 A1 | 3/2017 | Finlay et al. | |
| 2019/0034493 A1* | 1/2019 | Gopal | G06F 9/30036 |
| 2019/0065551 A1 | 2/2019 | Morimoto et al. | |

OTHER PUBLICATIONS

Yasin N. Silva et al., Exploiting common subexpressions for cloud query processing, Publisher: Columbia University, 12 pages.

* cited by examiner

REDUCING TEMP SIZE OVER A BASE TABLE

TECHNICAL FIELD

The present invention relates to database management systems. More specifically, the invention relates to systems and methods for reducing TEMP size over a base table in database management systems.

BACKGROUND

Common sub expressions (CSEs) are an effect method to optimize query execution when the same table (or set of tables) is accessed multiple times, either in different areas of the query, a collection of queries, or re-accessed due to correlation. Database systems exploit the use of CSEs within queries where the portion of the query below is evaluated once and the results are put into one or more temporary tables. These temporary tables may be in memory if small enough to fit, or could be spilled over to disk. Multiple consumers of the CSE within the query then only need to read the temporary table result to process the rest of the query. In large data warehouses, the result of a CSE may be very large and replace other data pages that may be frequently accessed and spilled to disk. The additional I/O to initially write out the data and for each consumer to read back the data for further processing is sometimes a significant resource cost that may deter a database optimizer from even choosing a CSE, but instead evaluate the common portion of the query itself multiple times. Overall, CSEs and temporary tables often require significant amounts of CPU, bufferpool and I/O to create and re-read.

SUMMARY

An embodiment of the present invention relates to a method, and associated computer system and computer program product. One or more processors of a computer system receives and parses an SQL query. At least one common sub expression, or sub-query, or combination thereof, used multiple times within the SQL and not identified in a stored list of common sub expression and sub-queries from previously executed SQL queries is identified. A query execution plan that maintains as part of an initial result set a bit vector for a fact table is constructed for the at least one common sub expression, or sub-query, or combination thereof, using a first flag value to indicate when a tuple from a base table is part of the initial result set and a second flag value to indicate when the tuple from the base table is not part of the initial result set. A result bit vector and an indicator that tracks a last valid tuple processed to produce the result bit vector is stored when a TEMP operation is indicated in the query execution plan. A TEMP result is reassessed in other portions of the query execution plan. A list of tuples are primed using the TEMP result. Respective columns are retrieved for further processing in the query execution plan.

DETAILED DESCRIPTION

Although certain embodiments are shown and described in detail, it should be understood that various changes and modifications may be made without departing from the scope of the appended claims. The scope of the present disclosure will in no way be limited to the number of constituting components, the materials thereof, the shapes thereof, the relative arrangement thereof, etc., and are disclosed simply as an example of embodiments of the present disclosure. A more complete understanding of the present embodiments and advantages thereof may be acquired by referring to the following description taken in conjunction with the accompanying drawings, in which like reference numbers indicate like features.

As a preface to the detailed description, it should be noted that, as used in this specification and the appended claims, the singular forms "a", "an" and "the" include plural referents, unless the context clearly dictates otherwise.

Figure 1:
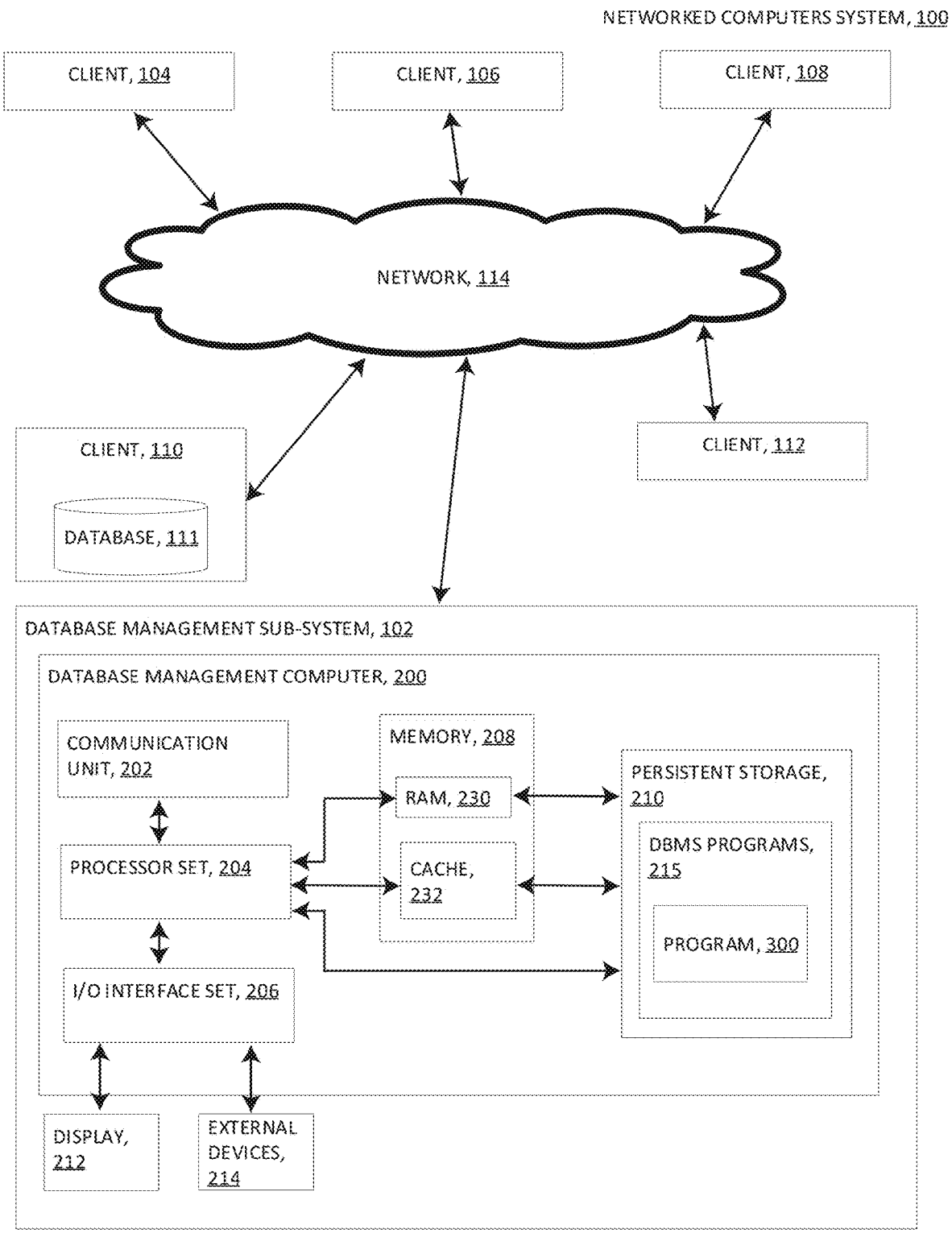
FIG. 1 depicts a block diagram of a system for reducing TEMP size over a base table, in accordance with embodiments of the present invention.

FIG. 1 depicts a block diagram of a system 100 for reducing TEMP size over a base table, in accordance with embodiments of the present invention. The system 100 for reducing TEMP size over a base table includes a database management (DBM) sub-system 102, client sub-systems 104, 106, 108, 110, 112, database 111, communication network 114, database management computer 200, communication unit 202, processor set 204, input/output interface set 206, memory device 208, persistent storage device 210, display device 212, external device set 214, database management system (DBMS) programs 215, random access memory (RAM) devices 230, cache memory device 232, and program 300.

The DBM sub-system 102 is representative of the various computer sub-systems in the present invention. Accordingly, several portions of the DBM sub-system 102 will now be discussed in the following paragraphs.

Sub-system 102 may be a database server, blade server, main frame or other large computing system, laptop computer, tablet computer, netbook computer, personal computer (PC), a desktop computer, a personal digital assistant (PDA), a smart phone, or any programmable electronic device capable of communicating with the client sub-systems via network 114. Program 300 is a collection of machine readable instructions and/or data that is used to create, manage, and control certain software functions that will be discussed in detail below.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications and network processors, etc.), system memory, peripheral devices, and any other hardware component within a system. For example, the communications fabric can be implemented, at least in part, with one or more buses.

Memory 208 and persistent storage 210 are computer readable storage media. The persistent storage 210 may be an internal device that includes data storage capabilities. In general, memory 208 can include any suitable volatile or non-volatile computer readable storage media. It is further noted that, now and/or in the near future: (i) external device(s) 214 may be able to supply, some or all, memory for sub-system 102; and/or (ii) devices external to sub-system 102 may be able to provide memory for sub-system 102. In some embodiments, external device(s) 214 may include data storage capabilities.

Program 300 is stored in persistent storage 210 for access and/or execution by one or more of the respective computer processors 204, usually through one or more memories of memory 208. Program 300 is located within DBMS programs 215, where other programs (not shown) carry out various functions of database management. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

Program 300 may include both machine readable and performable instructions, and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either, or both, physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with computer 200. For example, I/O interface set 206 provides a connection to external device set 214. External device set 214 will typically include devices such as a keyboard, keypad, a touch screen, and/or some other suitable input device. External device set 214 can also include portable computer readable storage media such as, for example, thumb drives, portable optical or magnetic disks, memory cards, and disk arrays (e.g. multi-terabyte or multi-petabyte external storage devices). Software and data used to practice embodiments of the present invention, for example, program 300, can be stored on such portable computer readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Database 111 is an organized collection of data. The data is typically organized to model aspects of reality in a way that supports processes requiring information. The database 111 is configured to show that the database management sub-system 102 may be configured to interact with other client databases 111 over the network 114.

Program 300 operates to reduce TEMP size over a base table by TEMPing only the bit-vector that records an indicator of a subset of rows that qualified a predicate or predicates applied to the base table, along with the last committed Tuple Sequence Number (TSN), Row Identifier (RID) and/or Log Sequence Number (LSN) associated with the computation of the base table bit-vector. Further, program 300 operates to store the result bit-vector that is a very compact representation of the application of the predicate or predicates. Program 300 may store the result bit-vector as a partial materialized query table (MQT) associated with the base table, allowing for an exact, filtered retrieval of the base table tuples and thereby construct the full result set in a time and space efficient manner. The program 300 may operate to store filter vectors for other tables involved in a subquery, CSE, or MQT, enabling precise processing of tables involved in the subquery, CSE, or MQT, and reducing predicate application, join processing, and tuple retrieval overhead. The program 300 may further store payload columns associated with each dimension table joined by the subquery, CSE, or MQT, as a pre-computed and packed column associated with the stored filter vectors.

Some embodiments of the present invention recognize the following facts, potential problems and/or potential areas for improvement with respect to the current state of the art: i) common sub-expressions (CSE) and temporary tables often require significant amounts of CPU, bufferpool and I/O to create or instantiate; ii) conventional database engines that are asked to temporarily store the results of a sub-query, or a view over one or more tables, must make copies of all the data elements in each tuple, and store all of those values in memory, buffers, or on a disk; and iii) temporarily storing these results is expensive in computer resources, redundant, or even unnecessary.

The DBMS sub-system 102 may be configured to exploit the use of CSEs within queries where the portion of the query below is evaluated once and the results are put in temporary tables. These temporary tables may be large, and may frequently replace other data pages that may be frequently accessed and may even spill to disk. The additional I/O to initially write out the data, and for each consumer to read back the data for further processing, are often a significant cost in conventional database systems, and may even deter the database optimizer from choosing a CSE and instead evaluate the common portion of the query multiple times.

The DBMS sub-system 102 may be configured to utilize materialized views, or Materialized Query Tables (MQTs). CSE's provide the definition of the MQTs that are materialized. Queries that contain patterns that can be derived from the MQT replace the matching portion of the query with the MQT definition and can reuse the result of the MQT without doing all that was necessary to evaluate the result. However, conventionally, it is often difficult to get the right MQT that will service a large number of queries effectively. A very high level of aggregated query loses the detailed information and is only beneficial for a few queries. A large number of MQTs at various dimension levels may be required to be defined in order to cover more queries. If an MQT becomes too granular, it may become as large as the fact tables and become as costly as accessing the table itself. Further, maintenance of MQTs may be expensive as base tables are updated.

The DBMS sub-system 102 may be configured to correlate subqueries in a query execution model when a subquery is re-evaluated for each outer value or set of values. Often, the outer values come from a table or stream that has repeated values. If the result of the subquery is large and the outer set of values is large, caching of the actual results for reuse when there is repetition may become expensive in terms of processing and/or memory requirements.

The DBMS sub-system 102 may be configured to implement common semi-join techniques using a CSE after a repeated access to a large base table with re-application of the predicates. The repeated predicate application and scanning of the predicate columns of a table twice, once for a semijoin, and the second time for a query result itself may further become expensive in terms of processing and/or memory requirements.

The DBMS sub-system 102 may be configured to use bit vector-based value storage by storing a bit vector for each value that occurs in a column, indicating the tuples that have that value. If there are 5 values, then 5 bit vectors are stored. Conventional bit vectors have to be pre-defined and are generally stored for each predicate column. Maintenance of these bit vector indexes is also expensive in terms of processing and/or memory requirements.

The database management system 102, computer 200, and/or program 300 thereof may be configured to TEMP a pre-filtered vector of a fact or base table, in order to greatly reduce the CSE size, and may be configured to convert a CSE into a columnar MQT, all with low costs of maintaining the resulting MQT in terms of processing and/or memory requirements. The database management system 102, computer 200, and/or program 300 thereof may be configured to eliminate unnecessary copying of tuples' data elements to buffer and disk, and instead store a decision result vector, which records either a bit per row, or optionally a row identifier list, or block identifier list per table. The database management system 102, computer 200, and program 300 thereof may be configured to thereby quickly reconstruct the fully instantiated result set based on the decision result vector.

In embodiments of the present invention, the database management system 102, computer 200, and program 300 thereof may be configured to receive and parse an SQL query from one or more of the clients 104, 106, 108, 110, 112. The database management system 102, computer 200, and program 300 thereof may be configured to identify common sub-expressions (CSEs) and sub-queries (SQs) that are used multiple times within a query.

In embodiments of the present invention, the database management system 102, computer 200, and program 300 thereof may be configured to construct a Query Execution Plan (QEP) for each CSE and SQ that maintains, as part of the initial result set, a bit-vector using a flag value (e.g. "1") to indicate if a tuple from a base table is part of the result set, and another flag value (e.g. "0") to indicate if a tuple from a base table is not part of the result set. A bit vector may be maintained for the base or fact table in the CSE or SQ. Dimension tables may also have a bit vector maintained for them in this manner, or TSNs, RIDs or LSNs, or other direct reference to the dimension table to allow direct retrieval of the associated dimension values.

Prior to the construction of the QEP as described above, some embodiments of the present invention entail the database management system 102, computer 200, and program 300 thereof being configured to perform a search of a stored list of CSEs and SQs from previously executed SQL queries and retrieve a bit vector TEMP table. The database management system 102, computer 200, and program 300 thereof may be configured to test to ensure a last TSN (Tuple Sequence Number), RID (Row Identifier), or LSN (Log Sequence Number) associated with each of the tables involved in the stored CSE or SQ is still current, and if so determine that a result vector is still current and valid. The database management system 102, computer 200, and program 300 thereof may be configured to mark a cached result set as being partial, and use the cached result set to prime a query execution plan, allowing the query execution plan to start at the last TSN, RID, or LSN and continue forward to the current last TSN, RID or LSN. Thus, the database management system 102, computer 200, and program 300 thereof may be configured to indicate a starting point for continuing evaluation of existing partial result sets. If a result set is determined to be no longer value, the database management system 102, computer 200, and program 300 thereof may be configured to discard it.

When a TEMP operation is indicated in the QEP, embodiments of the invention include the database management system 102, computer 200, and program 300 thereof instead of storing the actual column values being produced by the database management system 102, being configured to instead store the result bit vector. The database management system 102, computer 200, and program 300 thereof may be configured to store the result bit vector with an indicator that tracks the last valid tuple that was processed to produce the result bit vector. This indicator could be the last TSN, RID or LSN associated with each of the tables involved in the CSE or SQ. The database management system 102, computer 200, and program 300 thereof may be configured to store or catalogue the TEMP's CSE or SQ in a manner that allows other queries to make use of the result bit vector. The database management system 102, computer 200, and program 300 thereof may be configured to store one or more associated columns with dimension table values materialized. The database management system 102, computer 200, and program 300 thereof may be configured to store one or more dimension table TSNs, RIDs or LSNs to allow direct retrieval of any columns from the dimension table.

When a TEMP result is re-accessed in other portions of the QEP for the entire SQL query, the database management system 102, computer 200, and program 300 thereof may be configured to access the TEMP to prime the list of tuples. Thus, the database management system 102, computer 200, and program 300 thereof may be configured to retrieve the needed columns for further processing by the QEP.

Figure 2:
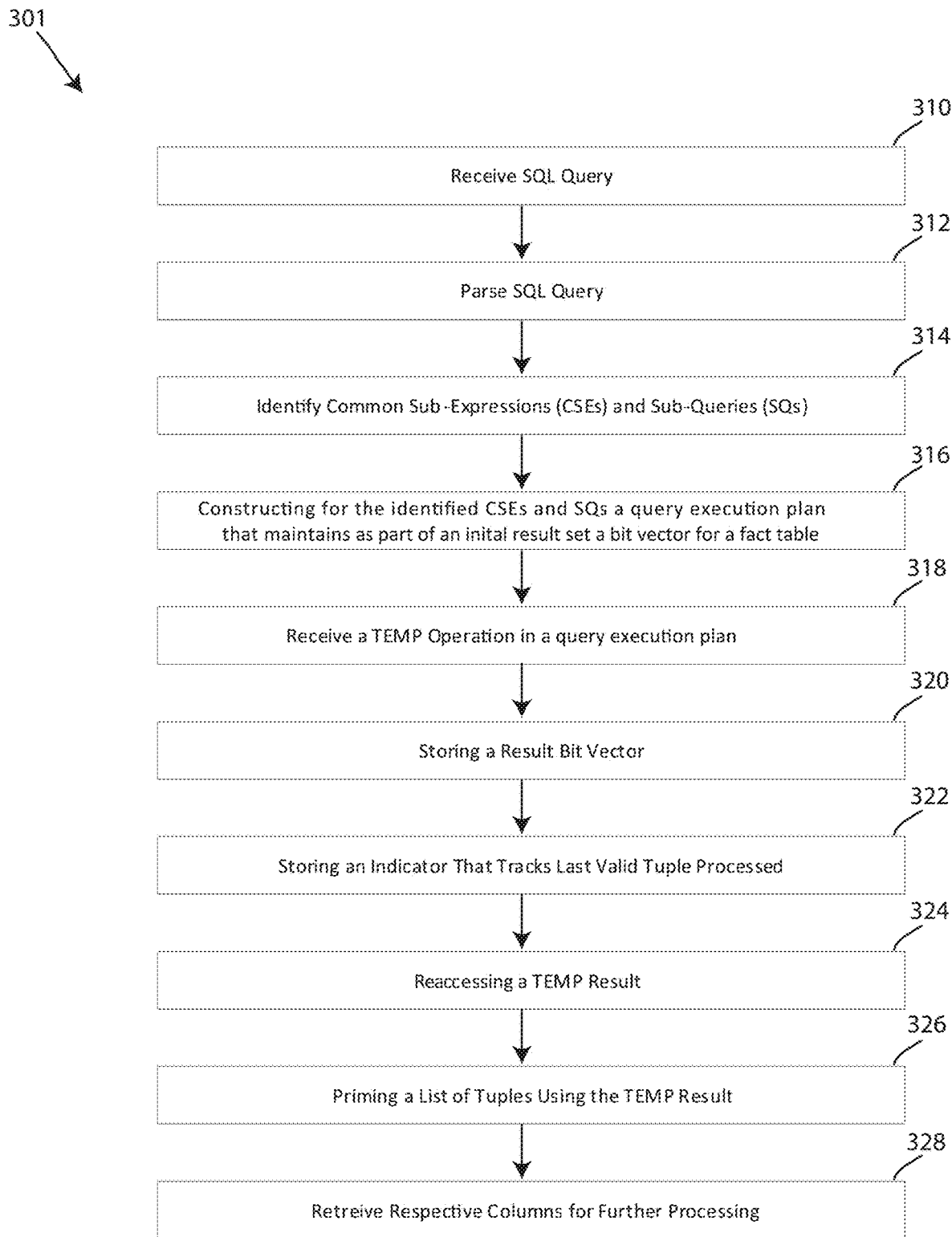
FIG. 2 depicts a flow chart of a method for reducing TEMP size over a base table, in accordance with embodiments of the present invention.

FIG. 2 depicts a flow chart of a method 301 for reducing TEMP size over a base table, in accordance with embodiments of the present invention. The method 301 includes a step 310 of receiving an SQL query, then a step 312 of parsing the received SQL query. The method 301 then includes a step 314 of identifying one or more common sub-expressions (CSEs) and one or more sub-queries (SQs). A step 316 of the method 301 includes constructing for the one or more CSEs and SQs a query execution plan that maintains as part of an initial result set a bit vector for a fact table. This step 316 may include using a first flag value to indicate when a tuple from a base table is part of the initial result set and a second flag value to indicate when the tuple from the base table is not part of the initial result set. The step 318 includes receiving a TEMP operation in the query execution plan. The method 301 includes a step 320 of storing a result bit vector, and a step 322 of storing an indicator that tracks a last valid tuple processed and producing the result bit vector. The storing step 320 may include storing a common sub-expression and sub-query of the TEMP operation in a manner allowing other queries to make use of the result bit vector. The step 320 may alternatively or additionally include storing one or more associated columns of the result bit vector with a dimension table materialized, and/or storing the one or more associated columns of the result bit vector with one or more dimension table tuple sequence numbers or row identifiers to allow direct retrieval of any columns from the dimension table. Steps 320 and 322 may occur when a TEMP operation is indicated in the query execution plan. The method 301 includes a step 324 of reassessing a TEMP result in other portions of the query execution plan, a step 326 of priming a list of tuples using the TEMP result, and a step 328 of retrieving respective columns for further processing in the query execution plan.

Figure 3:
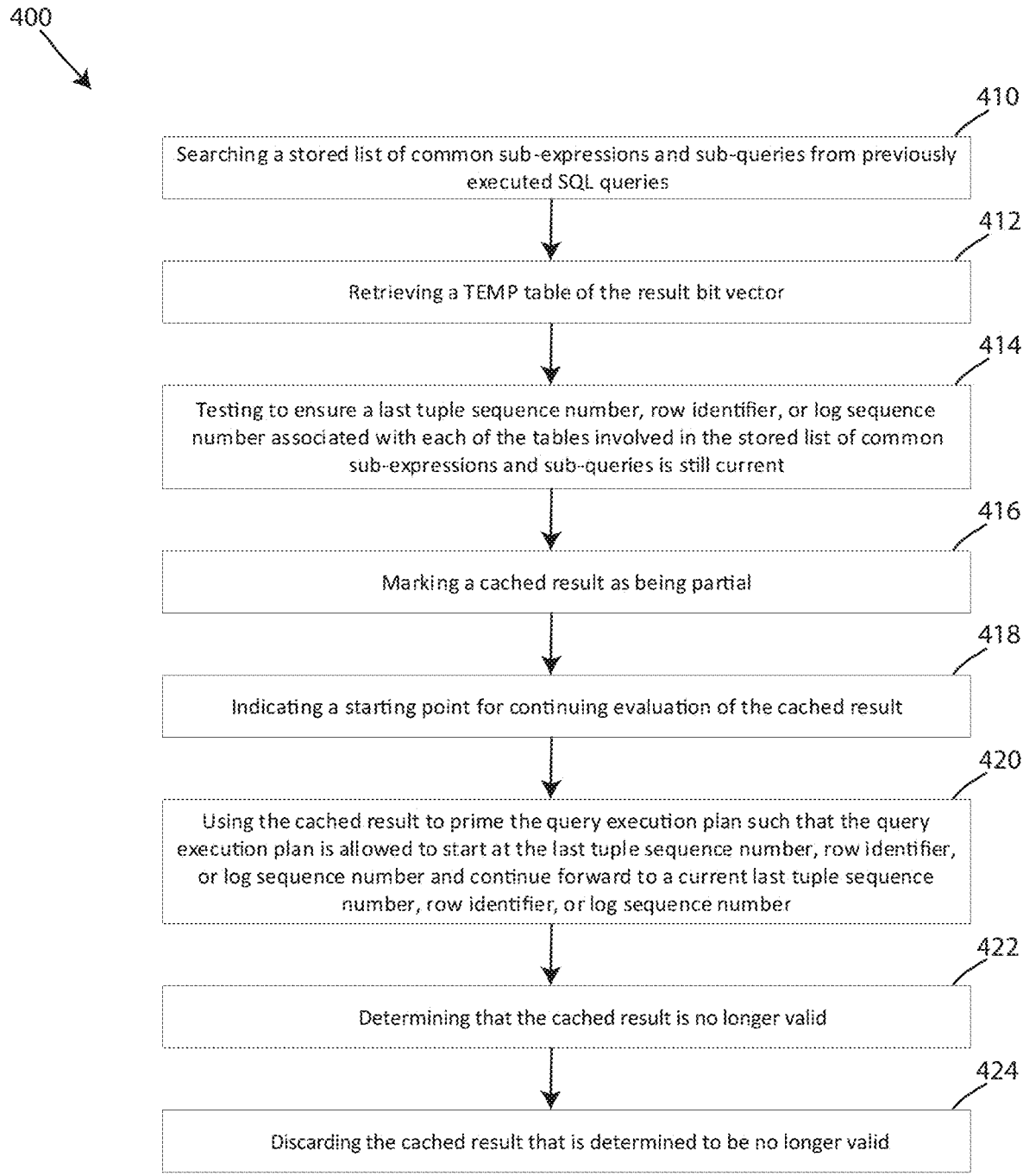
FIG. 3 depicts a flow chart of another method for reducing TEMP size over a base table, in accordance with embodiments of the present invention.

FIG. 3 depicts a flow chart of another method 400 for reducing TEMP size over a base table, in accordance with embodiments of the present invention. The method 400 may include additional and/or alternative steps for the method 301 of FIG. 2. The method 400 includes a first step 410 of searching a stored list of common sub-expressions and sub-queries from previously executed SQL queries. The method 400 includes a step 412 of retrieving a TEMP table of the result bit vector. The method 400 includes a step 414 of testing to ensure a last tuple sequence number, row identifier, or log sequence number associated with each of the tables involved in the stored list of common sub-expressions and sub-queries is still current. The method 400 then includes a step 416 of marking a cached result as being partial, a step 418 of indicating a starting point for continuing evaluation of the cached result. The method 400 then includes a step 420 of using the cached result to prime the query execution plan such that the query execution plan is allowed to start at the last tuple sequence number, row identifier, or log sequence number and continue forward to a current last tuple sequence number, row identifier, or log sequence number. The method 400 includes the step 422 of determining that the cached result is no longer valid, and a step 424 of discarding the cached result in the event that the cached result is determined to be no longer valid.

Some embodiments of the present invention may include one, or more, of the following features, characteristics and/or advantages: i) greatly reducing the size of a TEMP over a base table; ii) reducing processing costs of complex or expensive predicates, either within a query where the same predicates must be applied to the same table multiple times, or for re-use of predicate applications across multiple queries; iii) eliminating the unnecessary copying of the tuples' data elements to buffer and disk, and instead storing a decision result vector, which records either a bit per row, or optionally a row identifier list or block identifier list per table; iv) allowing a database engine to very quickly reconstruct the fully instantiated result set based on the decision result vector; v) allowing for fast retrieval of a result in cases where joined columns are either very small, or expensive to retrieve.

The present invention may include many practical applications. By way of example, a practical application of the present invention includes a view V1 that has been included in a database schema that qualifies all tuples in a table, T1, that fall into a particular data range: T1.xdate between Jan. 1, 2013 and Dec. 31, 2013. This view is then used in a number of queries. A query execution plan may be generated which applies the predicate on the data column for Jan. 1, 2013 through Dec. 31, 2013. The resulting filtering vector from that predicate application is stored in a bit-vector temporary table associated with the definition of the view V1. The following query is then entered by a user application that includes the subject view multiple times:

Select vX.col1, vX.col2, from V1 as vX where vX.col3 in (select vY.col4 from V1 and vY where vY.col5>9

The query optimizer, instead of re-computing the tuples that qualify view V1, and filtering multiple times, instead accesses the stored result vector, and initiates processing for use as "vY", retrieving only columns "col4" and "col5" from base table T1. The query optimizer also re-uses the pre-computed result vector for use as "vX", retrieving a different set of column from T1, col1, col2 and col3. It should be understood that this a single practical application, but the features and characteristics and methods of the present invention may be applicable to many advantageous practical applications that improve over the prior art.

Figure 4:
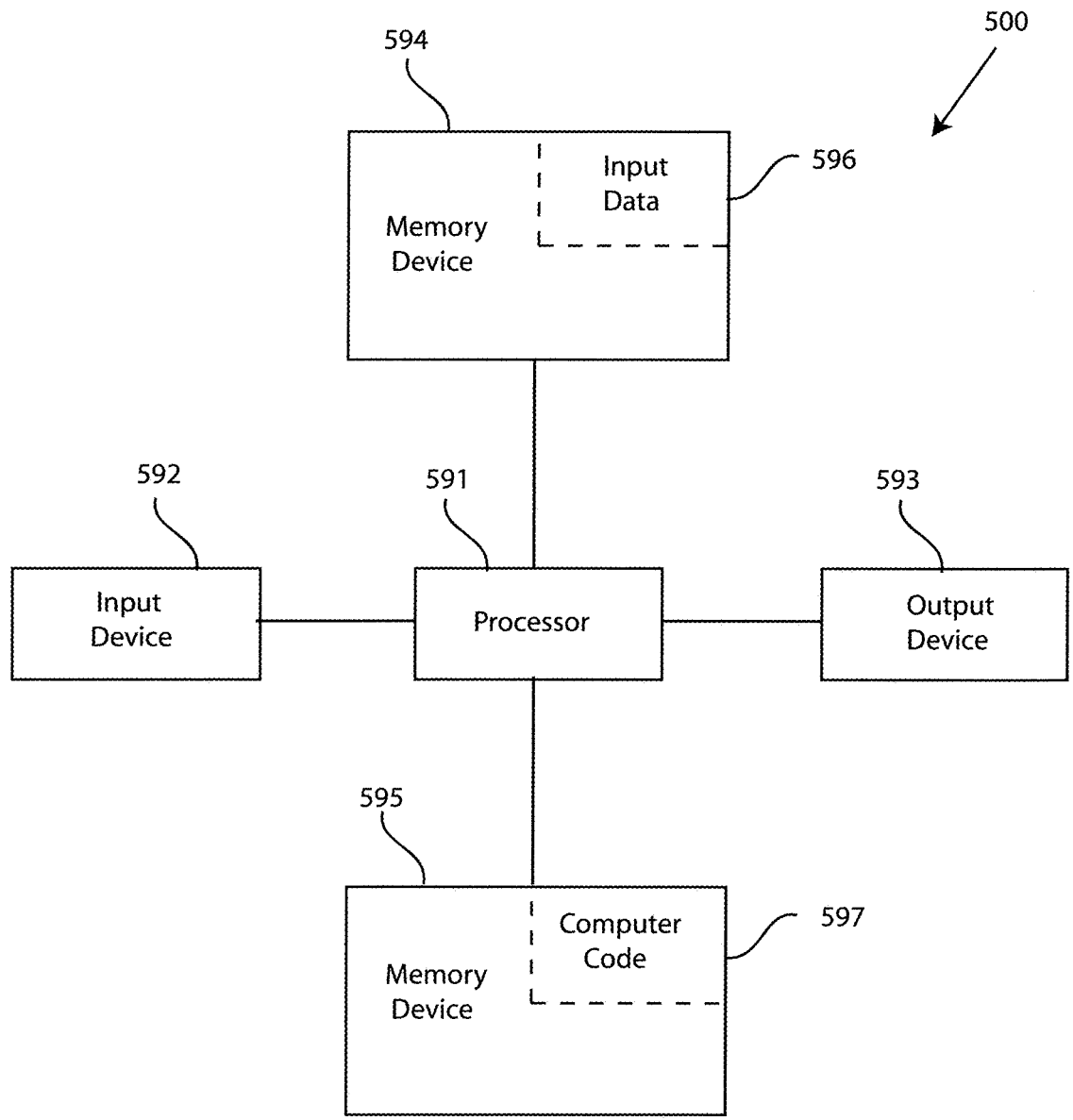
FIG. 4 depicts a block diagram of a computer system of the system for reducing TEMP size over a base table of FIG. 1, capable of implementing methods for reducing TEMP size over a base table in FIGS. 2-3, in accordance with embodiments of the present invention.

FIG. 4 illustrates a block diagram of a computer system that may be representative of any computer or computer system within the system 100 for reducing TEMP size over a base table of FIG. 1, capable of implementing methods for reducing TEMP size over a base table of FIGS. 2-3, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for reducing TEMP size over a base table, in the manner prescribed by the embodiments of FIGS. 2-3 using the system 100 for reducing TEMP size over a base table of FIG. 1, wherein the instructions of the computer code 597 may be executed by processor 591 via memory device 595. The computer code 597 may include software or program instructions that may implement one or more algorithms for implementing the methods for reducing TEMP size over a base table, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer readable program embodied therein and/or having other data stored therein, wherein the computer readable program comprises the computer code 597. Generally, a computer program product (or, alternatively, an article of manufacture) of the computer system 500 may comprise said computer usable storage medium (or said program storage device).

Memory devices 594, 595 include any known computer readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 4.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer system 500, and may include any type of transmission link, including electrical, optical, wireless, etc.

An I/O interface may allow computer system 500 to store information (e.g., data or program instructions such as computer code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to systems and methods for reducing TEMP size over a base table. Thus, an embodiment of the present invention discloses a process for supporting computer infrastructure, where the process includes providing at least one support service for at least one of integrating, hosting, maintaining and deploying computer-readable code (e.g., computer code 597) in a computer system (e.g., computer system 500) including one or more processor(s) 591, wherein the processor(s) carry out instructions contained in the computer code 597 causing the computer system to provide a system for reducing TEMP size over a base table. Another embodiment discloses a process for supporting computer infrastructure, where the process includes integrating computer-readable program code into a computer system including a processor.

The step of integrating includes storing the program code in a computer-readable storage device of the computer system through use of the processor. The program code, upon being executed by the processor, implements a method for reducing TEMP size over a base table. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for reducing TEMP size over a base table.

A computer program product of the present invention comprises one or more computer readable hardware storage devices having computer readable program code stored therein, said program code containing instructions executable by one or more processors of a computer system to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models areas follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
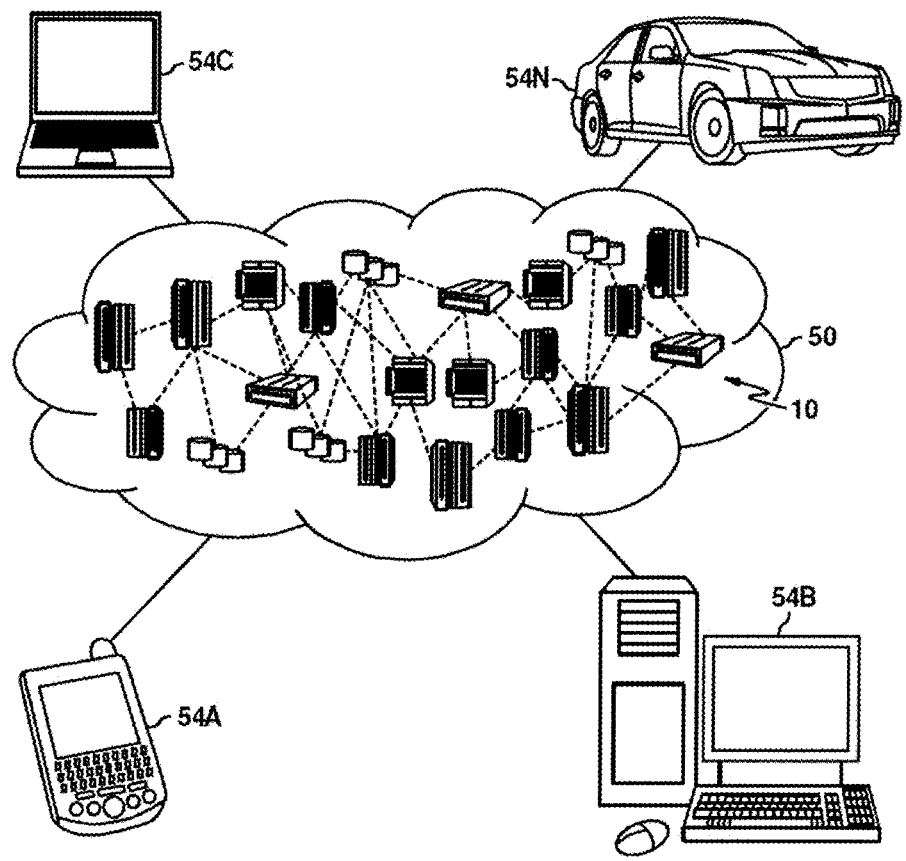
FIG. 5 depicts a cloud computing environment, in accordance with embodiments of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 5 are intended to be illustrative only and that computing nodes 10 and cloud computing environment 50 can communicate with any type of computerized device over any type of network and/or network addressable connection (e.g., using a web browser).

Figure 6:
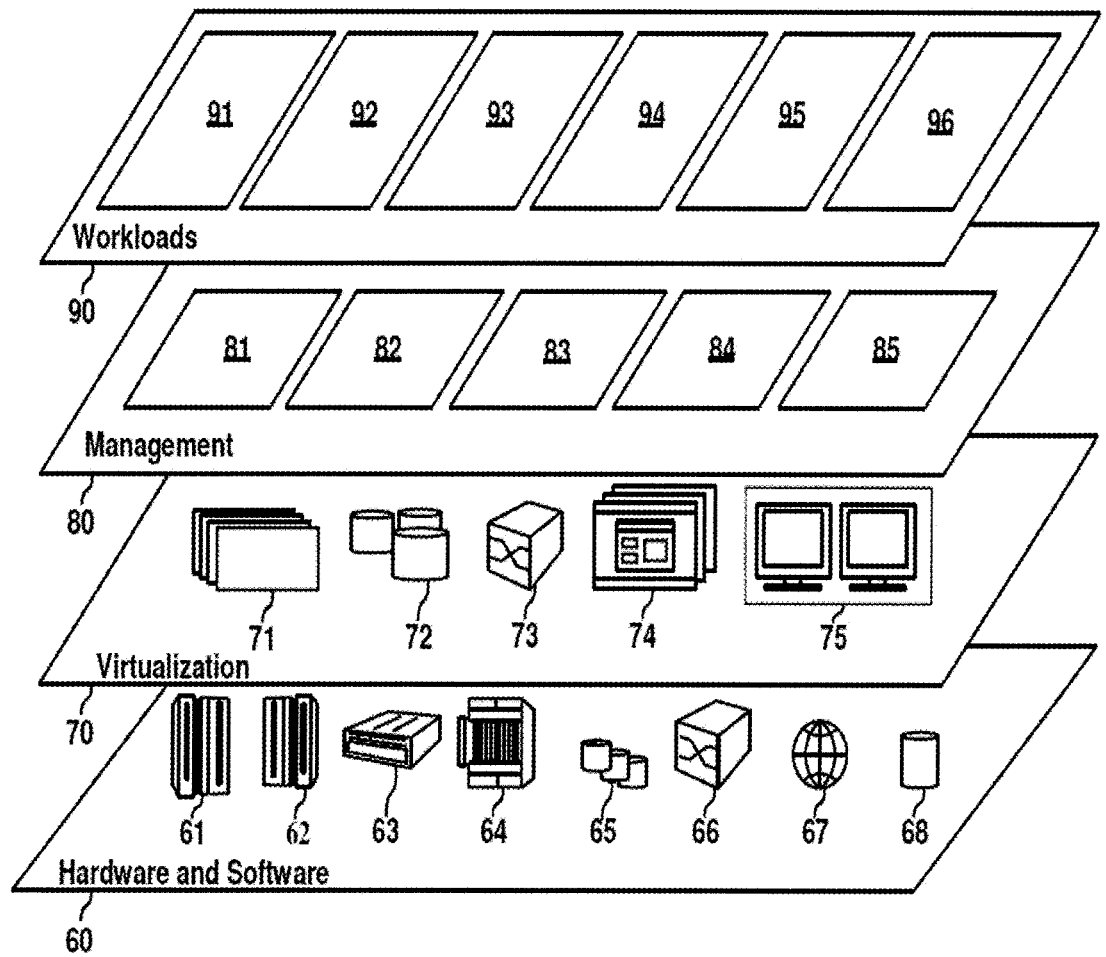
FIG. 6 depicts abstraction model layers, in accordance with embodiments of the present invention.

Referring now to FIG. 6, a set of functional abstraction layers provided by cloud computing environment 50 (see FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing related to reducing TEMP size over a base table 96.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A computer-implemented method comprising:
receiving, by one or more processors of a computer system, an SQL query;
parsing, by the one or more processors of the computer system, the SQL query;
identifying, by the one or more processors of the computer system, at least one common sub expression, or sub-query, or combination thereof, used multiple times within the SQL query and not identified in a stored list of common sub expressions and sub-queries from previously executed SQL queries;
constructing for the at least one common sub expression, or sub-query, or combination thereof, by the one or more processors of the computer system, a query execution plan that maintains as part of an initial result set a bit vector for a fact table using a first flag value to indicate when a tuple from a base table is part of the initial result set and a second flag value to indicate when the tuple from the base table is not part of the initial result set;
storing, by the one or more processors of the computer system, a result bit vector and an indicator that tracks a last valid tuple processed to produce the result bit vector when a TEMP operation is indicated in the query execution plan;
reassessing, by the one or more processors of the computer system, a TEMP result in other portions of the query execution plan;
priming, by the one or more processors of the computer system, a list of tuples using the TEMP result; and
retrieving, by the one or more processors of the computer system, respective columns for further processing in the query execution plan.

2. The method of claim 1, further comprising:
searching, by the one or more processors of the computer system, a stored list of common sub-expressions and sub-queries from previously executed SQL queries;
retrieving, by the one or more processors of the computer system, a TEMP table of the result bit vector.

3. The method of claim 2, further comprising:
testing, by the one or more processors of the computer system, to ensure a last tuple sequence number, row identifier, or log sequence number associated with each of the tables involved in the stored list of common sub-expressions and sub-queries is still current;
marking, by the one or more processors of the computer system, a cached result as being partial;
using, by the one or more processors of the computer system, the cached result to prime the query execution plan such that the query execution plan is allowed to start at the last tuple sequence number, row identifier, or log sequence number and continue forward to a current last tuple sequence number, row identifier, or log sequence number;
determining, by the one or more processors of the computer system, that the cached result is no longer valid; and
discarding, by the one or more processors of the computer system, the cached result that is determined to be no longer valid.

4. The method of claim 3, further comprising:
indicating, by the one or more processors of the computer system, a starting point for continuing the evaluation of the cached result.

5. The method of claim 1, further comprising:
storing, by the one or more processors of the computer system, a common sub-expression and sub-query of the TEMP operation in a manner allowing other queries to make use of the result bit vector.

6. The method of claim 5, further comprising:
storing, by the one or more processors of the computer system, one or more dimension table tuple sequence numbers or row identifiers with the result bit vector to allow direct retrieval of any columns from the at least one dimension table.

7. The method of claim 6, further comprising:
storing, by the one or more processors of the computer system, one or more associated columns of the result bit vector materialized from at least one dimension table.

8. A computer system, comprising:
one or more processors;
one or more memory devices coupled to the one or more processors; and
one or more computer readable storage devices coupled to the one or more processors, wherein the one or more storage devices contain program code executable by the one or more processors via the one or more memory devices to implement a method, the method comprising:
receiving, by the one or more processors of the computer system, an SQL query;
parsing, by the one or more processors of the computer system, the SQL query;
identifying, by the one or more processors of the computer system, at least one common sub expression, or sub-query, or combination thereof, used multiple times within the SQL query and not identified in a stored list of common sub expressions and sub-queries from previously executed SQL queries;
constructing for the at least one common sub expression, or sub-query, or combination thereof, by the one or more processors of the computer system, a query execution plan that maintains as part of an initial result set a bit vector for a fact table using a first flag value to indicate when a tuple from a base table is part of the initial result set and a second flag value to indicate when the tuple from the base table is not part of the initial result set;
storing, by the one or more processors of the computer system, a result bit vector and an indicator that tracks a last valid tuple processed to produce the result bit vector when a TEMP operation is indicated in the query execution plan;

reassessing, by the one or more processors of the computer system, a TEMP result in other portions of the query execution plan;

priming, by the one or more processors of the computer system, a list of tuples using the TEMP result; and retrieving, by the one or more processors of the computer system, respective columns for further processing in the query execution plan.

9. The computer system of claim 8, the method further comprising:

searching, by the one or more processors of the computer system, a stored list of common sub-expressions and sub-queries from previously executed SQL queries;

retrieving, by the one or more processors of the computer system, a TEMP table of the result bit vector.

10. The computer system of claim 9, the method further comprising:

testing, by the one or more processors of the computer system, to ensure a last tuple sequence number, row identifier, or log sequence number associated with each of the tables involved in the stored list of common sub-expressions and sub-queries is still current;

marking, by the one or more processors of the computer system, a cached result as being partial;

using, by the one or more processors of the computer system, the cached result to prime the query execution plan such that the query execution plan is allowed to start at the last tuple sequence number, row identifier, or log sequence number and continue forward to a current last tuple sequence number, row identifier, or log sequence number;

determining, by the one or more processors of the computer system, that the cached result is no longer valid; and discarding, by the one or more processors of the computer system, the cached result that is determined to be no longer valid.

11. The computer system of claim 10, the method further comprising:

indicating, by the one or more processors of the computer system, a starting point for continuing the evaluation of the cached result.

12. The computer system of claim 8, the method further comprising:

storing, by the one or more processors of the computer system, a common sub-expression and sub-query of the TEMP operation in a manner allowing other queries to make use of the result bit vector.

13. The computer system of claim 12, the method further comprising:

storing, by the one or more processors of the computer system, one or more dimension table tuple sequence numbers or row identifiers with the result bit vector to allow direct retrieval of any columns from the at least one dimension table.

14. The computer system of claim 13, the method further comprising:

storing, by the one or more processors of the computer system, one or more associated columns of the result bit vector materialized from at least one dimension table.

15. A computer program product, comprising a computer readable hardware storage device storing a computer readable program code, the computer readable program code comprising an algorithm that when executed by one or more processors of a computer system implements a method, the method comprising:

receiving, by the one or more processors of the computer system, an SQL query;

parsing, by the one or more processors of the computer system, the SQL query;

identifying, by the one or more processors of the computer system, at least one common sub expression, or sub-query, or combination thereof, used multiple times within the SQL query and not identified in a stored list of common sub expressions and sub-queries from previously executed SQL queries;

constructing for the at least one common sub expression, or sub-query, or combination thereof, by the one or more processors of the computer system, a query execution plan that maintains as part of an initial result set a bit vector for a fact table using a first flag value to indicate when a tuple from a base table is part of the initial result set and a second flag value to indicate when the tuple from the base table is not part of the initial result set;

storing, by the one or more processors of the computer system, a result bit vector and an indicator that tracks a last valid tuple processed to produce the result bit vector when a TEMP operation is indicated in the query execution plan;

reassessing, by the one or more processors of the computer system, a TEMP result in other portions of the query execution plan;

priming, by the one or more processors of the computer system, a list of tuples using the TEMP result; and retrieving, by the one or more processors of the computer system, respective columns for further processing in the query execution plan.

16. The computer program product of claim 15, the method further comprising:

searching, by the one or more processors of the computer system, a stored list of common sub-expressions and sub-queries from previously executed SQL queries;

retrieving, by the one or more processors of the computer system, a TEMP table of the result bit vector.

17. The computer program product of claim 16, the method further comprising:

testing, by the one or more processors of the computer system, to ensure a last tuple sequence number, row identifier, or log sequence number associated with each of the tables involved in the stored list of common sub-expressions and sub-queries is still current;

marking, by the one or more processors of the computer system, a cached result as being partial;

using, by the one or more processors of the computer system, the cached result to prime the query execution plan such that the query execution plan is allowed to start at the last tuple sequence number, row identifier, or log sequence number and continue forward to a current last tuple sequence number, row identifier, or log sequence number;

determining, by the one or more processors of the computer system, that the cached result is no longer valid; and discarding, by the one or more processors of the computer system, the cached result that is determined to be no longer valid.

18. The computer program product of claim 17, the method further comprising:

indicating, by the one or more processors of the computer system, a starting point for continuing the evaluation of the cached result.

19. The computer program product of claim 15, the method further comprising:
storing, by the one or more processors of the computer system, one or more dimension table tuple sequence numbers or row identifiers with the result bit vector to allow direct retrieval of any columns from the at least one dimension table.

20. The computer program product of claim 19, the method further comprising:
storing, by the one or more processors of the computer system, one or more associated columns of the result bit vector materialized from at least one dimension table.

* * * * *